United States Patent
Kigaku et al.

(10) Patent No.: US 9,459,598 B2
(45) Date of Patent: Oct. 4, 2016

(54) MOTOR CONTROL DEVICE

(71) Applicant: OKUMA Corporation, Niwa-gun, Aichi (JP)

(72) Inventors: Kazushige Kigaku, Aichi (JP); Tomohisa Kameyama, Aichi (JP)

(73) Assignee: Okuma Corporation, Niwa-Gun, Aichi (JP)

( * ) Notice: Subject to any disclaimer, the term of this patent is extended or adjusted under 35 U.S.C. 154(b) by 0 days.

(21) Appl. No.: 14/576,600

(22) Filed: Dec. 19, 2014

(65) Prior Publication Data

US 2015/0177710 A1 Jun. 25, 2015

(30) Foreign Application Priority Data

Dec. 19, 2013 (JP) ................................ 2013-262850

(51) Int. Cl.
*G05B 13/00* (2006.01)
*G05B 13/02* (2006.01)

(52) U.S. Cl.
CPC .................... *G05B 13/02* (2013.01)

(58) Field of Classification Search
CPC .. G05B 15/02; G05B 13/041; G05B 19/402; G05B 2219/23431; G05B 2219/37372; G01P 15/00; F01L 13/0005; F01L 13/0015; F01L 13/0021; F01L 1/18; F01L 2013/113; H02P 23/14; H02P 6/001; H02P 8/24; H02P 8/32
See application file for complete search history.

(56) References Cited

U.S. PATENT DOCUMENTS

| | | | | |
|---|---|---|---|---|
| 3,700,379 A * | 10/1972 | Robertson | ............... | B21B 37/60 318/561 |
| 4,368,412 A * | 1/1983 | Inoue | ................... | G05B 19/231 318/568.1 |
| 5,157,597 A * | 10/1992 | Iwashita | ............... | C07C 275/26 318/561 |
| 5,204,602 A * | 4/1993 | Iwashita | .............. | G05B 19/404 318/561 |
| 5,598,077 A * | 1/1997 | Matsubara | ........... | G05B 19/404 318/568.22 |
| 5,608,640 A * | 3/1997 | Itoh | ...................... | G05B 19/231 318/568.18 |
| 5,936,366 A | 8/1999 | Hamamura et al. | | |
| 6,744,233 B1 * | 6/2004 | Tsutsui | ................. | G05B 19/404 318/560 |
| 2007/0075670 A1* | 4/2007 | Akiyama | ............. | G05B 19/416 318/651 |
| 2009/0174357 A1 | 7/2009 | Iwashita et al. | | |
| 2010/0052593 A1* | 3/2010 | Kishimoto | .......... | H02P 23/0068 318/561 |
| 2013/0278196 A1* | 10/2013 | Tian | .................... | G05B 13/0265 318/430 |
| 2013/0307459 A1* | 11/2013 | Tian | ..................... | G05B 19/416 318/570 |
| 2015/0177710 A1* | 6/2015 | Kigaku | .................. | G05B 13/02 318/561 |
| 2015/0295522 A1* | 10/2015 | Sakai | ..................... | G05D 17/02 318/631 |

FOREIGN PATENT DOCUMENTS

| | | |
|---|---|---|
| JP | H11-102211 A | 4/1999 |
| JP | 4327880 B2 | 9/2009 |
| JP | 2010-211467 A | 9/2010 |

* cited by examiner

*Primary Examiner* — Marlon Fletcher
(74) *Attorney, Agent, or Firm* — McCarter & English, LLC

(57) ABSTRACT

Control parameters such as an acceleration/deceleration time constant Tf, a position loop gain Kpf, a velocity loop proportional gain Pvf, and a velocity loop integral gain Ivf, each including respective values assigned to each of a plurality of different inertia values $J_0 \sim J_{max}$, are changed based on an inertia value $J_x$ calculated by an inertia identifying unit and an adjusted control parameter calculated by an automatic control-parameter adjustment unit.

5 Claims, 14 Drawing Sheets

MOTOR CONTROL DEVICE

CROSS-REFERENCE TO RELATED APPLICATIONS

This application claims priority under 35 U.S.C. 1.19(a)-(d) to Japanese Patent Application No. 2013-262850, filed Dec. 19, 2013, the content of which is incorporated herein by reference in its entirety as part of the present disclosure.

FIELD OF THE INVENTION

The present invention relates to a control device that controls motor position and velocity by calculating a control parameter corresponding to a workpiece inertia, based on respective control parameter values that are stored in advance in a memory device for each of a plurality of different inertia values.

BACKGROUND OF THE INVENTION

In a control device that controls position and velocity of a control target driven using a motor in a machining tool or the like, a control parameter is set so as to enable highly precise movement of the control target. However, since the inertia value at a shaft on which a workpiece (i.e., a machined object) is mounted becomes varied depending on the workpiece weight, if the control parameter is a fixed value, adaptations to changes in the inertia value cannot be made, so that the control parameter may not be optimal. Further, when the tool's control characteristic is changed due to changes over time, the control parameter may become unsuitable. Considering these points, for the purpose of maintaining tool precision, recently attempts have been made to change a control parameter in response to changes in the inertia value and the tool's changes over time.

JP 2010-211467 A discloses a technique of automatically estimating an inertia value of a workpiece, and setting a control parameter corresponding to the inertia value based on control parameters that are stored in advance in a memory device and adjusted according to a plurality of different inertia values.

FIG. 12 shows a control block diagram according to background art. With respect to a value output from a position command calculator 3, an acceleration/deceleration processor 4 performs acceleration/deceleration processing in accordance with an acceleration/deceleration processing time T set in the acceleration/deceleration processor 4, and outputs a position command value Pc. A subtractor 5 calculates a positional difference Pdif between the position command value Pc and a detected position value Pm from a motor position detector 11 mounted on a motor 22. The positional difference is multiplied by a proportional gain Kp to thereby output a velocity command Vc. A differentiator 16 differentiates the detected position value Pm and outputs a detected motor velocity value Vm. A subtractor 15 calculates a difference between the velocity command Vc and the detected motor velocity value Vm, and outputs the difference as a velocity difference. Based on the velocity difference, a velocity loop proportional gain Pv, and a velocity loop integral gain Iv, a proportional component of the velocity difference and an integral component of the velocity difference are output. An adder 9 adds together the proportional component of the velocity difference and the integral component of the velocity difference, and outputs a torque command Tc. Element 10 in FIG. 12 represents various filter units for filtering the torque command, and also a current control unit. Element 10 outputs a current Ic to the motor 22 to thereby rotate a ball screw 13 and to control position of a workpiece 24 mounted on a table 14.

Based on an acceleration Am output by a differentiator 26 by differentiating the detected velocity value Vm, and also based on the current Ic, an inertia identifying unit 17 identifies a workpiece inertia value $J_x$ and outputs the value to a control parameter setting unit 19. The inertia value $J_X$ input into the control parameter setting unit 19 may alternatively be an inertia value $J_X$ directly input by an operator using a graphical user interface (hereinafter referred to as "GUI") 18. A memory device 2 has stored therein, in advance, respective control parameter values assigned to each of a plurality of different inertia values $J_0 \sim J_{max}$, the control parameters being parameters such as acceleration/deceleration time constant Tf, position loop gain Kpf, velocity loop proportional gain Pvf, and velocity loop integral gain Ivf. Based on the respective control parameter values that are stored in the memory device 2 and assigned to each of the plurality of different inertia values $J_0 \sim J_{max}$, the control parameter setting unit 19 calculates values corresponding to the input inertia value $J_X$, and sets the calculated values as the control parameters.

FIGS. 13 to 16 are diagrams illustrating the relationships of the control parameters stored in the memory device 2 shown in FIG. 12 with respect to inertia. FIG. 13 shows the acceleration/deceleration time constant Tf, FIG. 14 shows the position loop gain Kpf, FIG. 15 shows the velocity loop proportional gain Pvf, and FIG. 16 shows the velocity loop integral gain Ivf. In each diagram, the inertia value $J_0$ denotes an inertia value obtained when no workpiece is mounted on the table 14 in FIG. 12, while $J_{max}$ denotes an inertia value obtained when a workpiece having the maximum mountable size is mounted on the table 14. $J_n$ denotes a plurality of different inertia values pre-specified between the inertia value $J_0$ obtained when no workpiece is mounted and the inertia value $J_{max}$ obtained when a maximum-sized workpiece is mounted. As shown in the diagrams, regarding each control parameter, optimum control parameter values are assigned to the respective preset inertia values $J_0 \sim J_{max}$.

FIG. 17 is a diagram explaining a process performed by the control parameter setting unit 19 shown in FIG. 12. Here, as an example, an explanation is given concerning a method of calculating, based on the values of acceleration/deceleration time constant Tf shown in FIG. 13, an acceleration/deceleration time constant value $T_x$ corresponding to an inertia value $J_x$ input from the inertia identifying unit 17. As shown in FIG. 17, when the input inertia value $J_x$ is a value between the inertia values $J_n$ and $J_{n-1}$, the acceleration/deceleration time constant $Tf_x$ corresponding to the inertia value $J_x$ is calculated using Formula 1 shown below, based on the acceleration/deceleration time constant values $Tf_n$ and $Tf_{n-1}$ assigned to the inertia values $J_n$ and $J_{n-1}$. Concerning other parameters too, by similarly calculating assigned values corresponding to the inertia value $J_x$, various control parameters corresponding to the inertia value can be obtained.

$$Tf_x = (Tf_n - Tf_{n-1}) \div (J_n - J_{n-1}) \times (J_x - J_{n-1}) + Tf_{n-1} \qquad \text{Formula 1}$$

JP H11-102211 A discloses a method of detecting a positional error of a control target generated when an operation is performed to reverse rotation of a shaft, and automatically adjusting a control parameter so that the positional error becomes smaller than a threshold value. FIG. 18 shows a control block diagram according to background art. Elements identical to those in the background art shown in FIG. 12 are labeled with the same reference symbols, and explanation thereof is not repeated.

An automatic control-parameter adjustment unit 20 receives input of position command values Pc and detected position values Pm at the time of performing an operation to reverse rotation of a shaft. Based on the input values, the automatic control-parameter adjustment unit 20 calculates positional errors, and determines whether the positional errors are not oscillating. When not oscillating, assigned values of control parameters such as the acceleration/deceleration time constant T, the position loop gain Kp, the velocity loop proportional gain Pv, and the velocity loop integral gain Iv are increased or decreased by a prescribed amount. Further, similar operations to reverse shaft rotation are repeated, and the assigned values of the control parameters are gradually changed. When the positional error becomes smaller than a threshold value, the values of the control parameters assigned at that point are used as the optimum values to update the control parameter values.

As another conventional example, JP 4327880 B discloses a method of adding an oscillating component as a torque disturbance to a torque command value, measuring a frequency characteristic of the control system using the torque disturbance as the input value and the torque command value as the output value of the system, and making adjustments to attain the optimum velocity loop proportional gain Pv and velocity loop integral gain Iv. FIG. 19 shows a control block diagram according to background art. Elements identical to those in the background art shown in FIG. 12 are labeled with the same reference symbols, and explanation thereof is not repeated.

An automatic control-parameter adjustment unit 120 adds an oscillating component as a torque disturbance Td to a torque command value Tc. Further, in the automatic control-parameter adjustment unit 120, the torque command value Tc before adding the torque disturbance Td is input, and a frequency characteristic is calculated using the torque disturbance Td as an input value into the control system and the torque command value Tc as an output value from the control system. Based on the calculated frequency characteristic, the velocity loop proportional gain Pv and the velocity loop integral gain Iv are adjusted.

Concerning the first technique described above, when the tool's control characteristic is changed due to changes over time, the control parameters stored in the memory device are no longer optimum, resulting in degradation of machining precision. In that situation, it is necessary to provide an arrangement for applying a plurality of workpiece inertia values with which initial adjustments had been made, and to perform re-adjustments with respect to those workpiece inertia values. However, it is difficult to provide such an arrangement for applying a plurality of workpiece inertia values with which initial adjustments had been made. Further, even if such an arrangement can be provided, it is a drawback in that much time is required to re-adjust the respective control parameters for each of the plurality of workpiece inertia values.

Furthermore, in the methods of obtaining optimum control parameters using an automatic control-parameter adjustment unit, although an optimum control parameter can be obtained for the workpiece inertia used during the adjustment, it is necessary to newly perform an adjustment every time the workpiece inertia is changed. Accordingly, it is a drawback in that much time is required to adjust the plurality of control parameters at each instance.

An object of the present invention is to achieve a configuration in which respective control parameter values that are stored in a memory device for each of a plurality of different inertia values can be changed into control parameter values conforming to the tool's control characteristic, without providing an arrangement for applying a plurality of workpiece inertia values with which initial adjustments had been made. A further object is to achieve a configuration in which, when the workpiece inertia is changed, a change into an optimum control parameter can always be made by simply identifying the inertia.

SUMMARY OF THE INVENTION

A control device according to the present invention comprises: a memory device having stored therein, in advance, respective values of a control parameter for each of a plurality of different inertia values, as standard control parameter values; and a control parameter setting unit that calculates, based on the standard control parameter values, a control parameter value corresponding to an inertia value of a control target, and sets the calculated value, wherein the control device is a device that controls position and velocity of a motor in accordance with the control parameter value set by the control parameter setting unit. The control device further comprises: an automatic control-parameter adjustment unit that drives the motor while using an adjustment control target and gradually altering a control parameter used for controlling position and velocity of the motor, and, based on a control error obtained at each instance the control parameter is altered, identifies a control parameter value suitable for the adjustment control target as an adjusted control parameter; and a control parameter changing unit that changes the plurality of standard control parameter values based on the adjusted control parameter and an inertia value of the control target.

In a preferred embodiment, the control parameter changing unit (i) calculates, based on the plurality of standard control parameter values, a control parameter value corresponding to the inertia value of the adjustment control target, as a reference control parameter, (ii) calculates a reference difference value between the adjusted control parameter and the reference control parameter corresponding to the inertia value of the adjustment control target, (iii) calculates, based on the reference difference value, adjusted difference values corresponding to the plurality of different inertia values, and (iv) calculates, as new standard control parameter values, values corresponding to the plurality of standard control parameter values by applying the adjusted difference values.

In the above-described configuration, it is desirable that, if the control parameter to be changed varies in proportion to inertia values, the control parameter changing unit calculates the adjusted difference values to be a constant value, and if the control parameter to be changed does not vary in proportion to inertia values, the control parameter changing unit calculates the adjusted difference values to be variable values that differ depending on the inertia values.

More specifically, it is desirable that, if the control parameter to be changed varies in proportion to inertia values, the reference difference value serves as the adjusted difference values. Further, it is desirable that, if the control parameter to be changed does not vary in proportion to inertia values, (i) the adjusted difference values corresponding to a maximum inertia value and a minimum inertia value among the plurality of different inertia values are zero, (ii) absolute values of the adjusted difference values corresponding to inertia values between the inertia value of the adjustment control target and the maximum inertia value are values reduced from the reference difference value in proportion to the inertia values, and (iii) absolute values of the adjusted difference values corresponding to inertia values between the inertia value of the adjustment control target and the minimum inertia value are values reduced from the reference difference value in proportion to the inertia values.

According to the control parameter changing unit of the present invention, an adjusted control parameter suitable for the inertia value of one adjustment control target is used as the basis for changing the plurality of standard control parameter values stored in advance in the memory device into values conforming to the tool's control characteristic. As such, the changes into the control parameter values conforming to the tool's control characteristic can be made without providing an arrangement for applying a plurality of workpiece inertia values with which initial adjustments had been made. Furthermore, even when the workpiece inertia value is changed, since the respective standard control parameter values stored in advance in the memory device for each of the plurality of workpiece inertia values have been changed into the standard control parameter values conforming to the tool's control characteristic, a change into an optimum control parameter can be made by simply identifying the inertia value.

BRIEF DESCRIPTION OF THE DRAWINGS

Preferred embodiments of the present invention will be described in detail with reference to the following figures, wherein.

DETAILED DESCRIPTION OF EMBODIMENTS OF THE INVENTION

Figure 1:
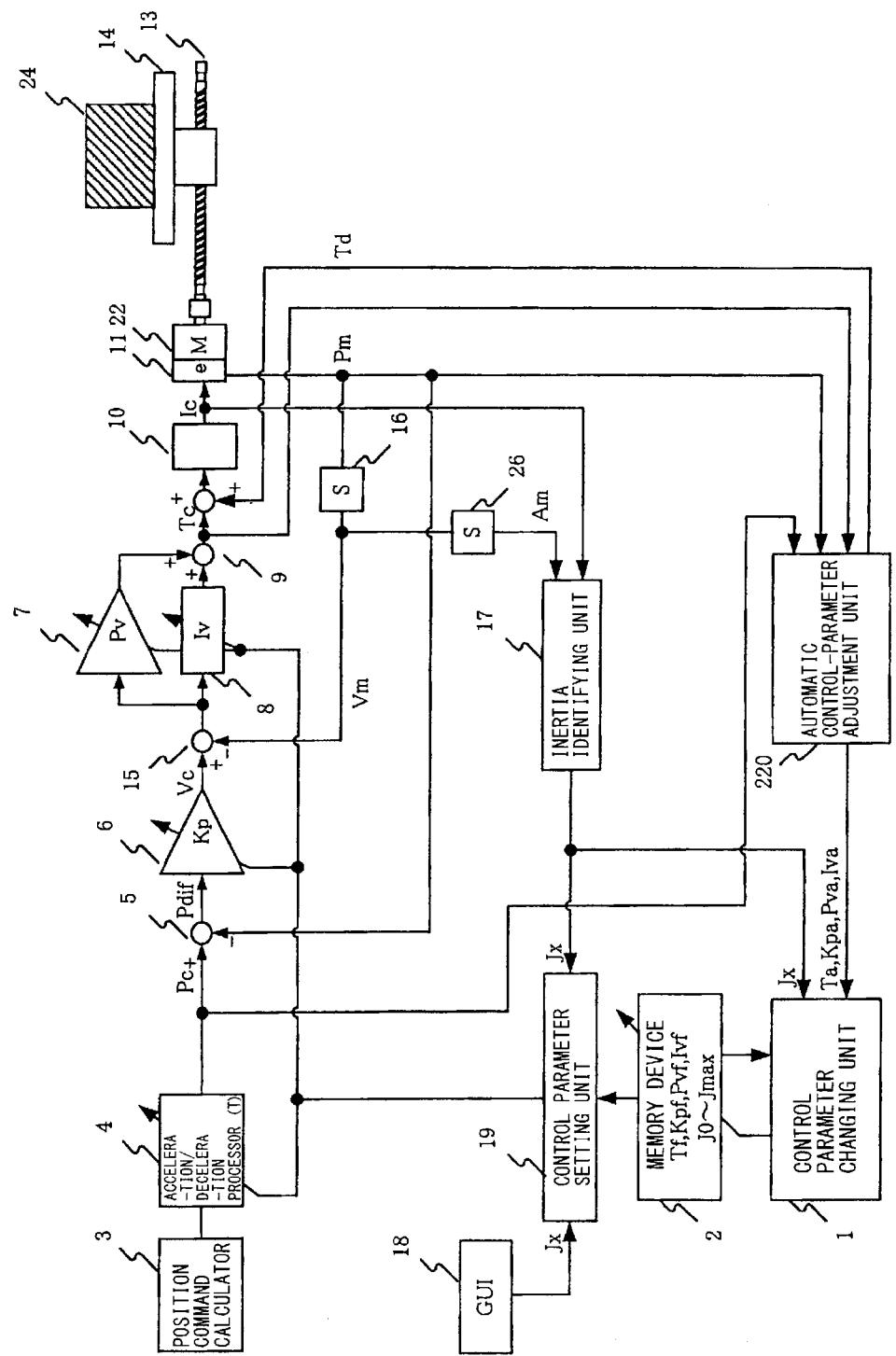
FIG. 1 is a diagram showing a configuration of a motor control device according to an example of the present invention.

An embodiment of the present invention will now be described. FIG. 1 shows an overall system configuration including the present invention. Elements identical to those in the above-described conventional examples are labeled with the same reference symbols, and explanation thereof is not repeated. In the following, the respective control parameter values stored in a memory device 2 for each of a plurality of different inertia values are referred to as "standard control parameter values".

Figure 18:
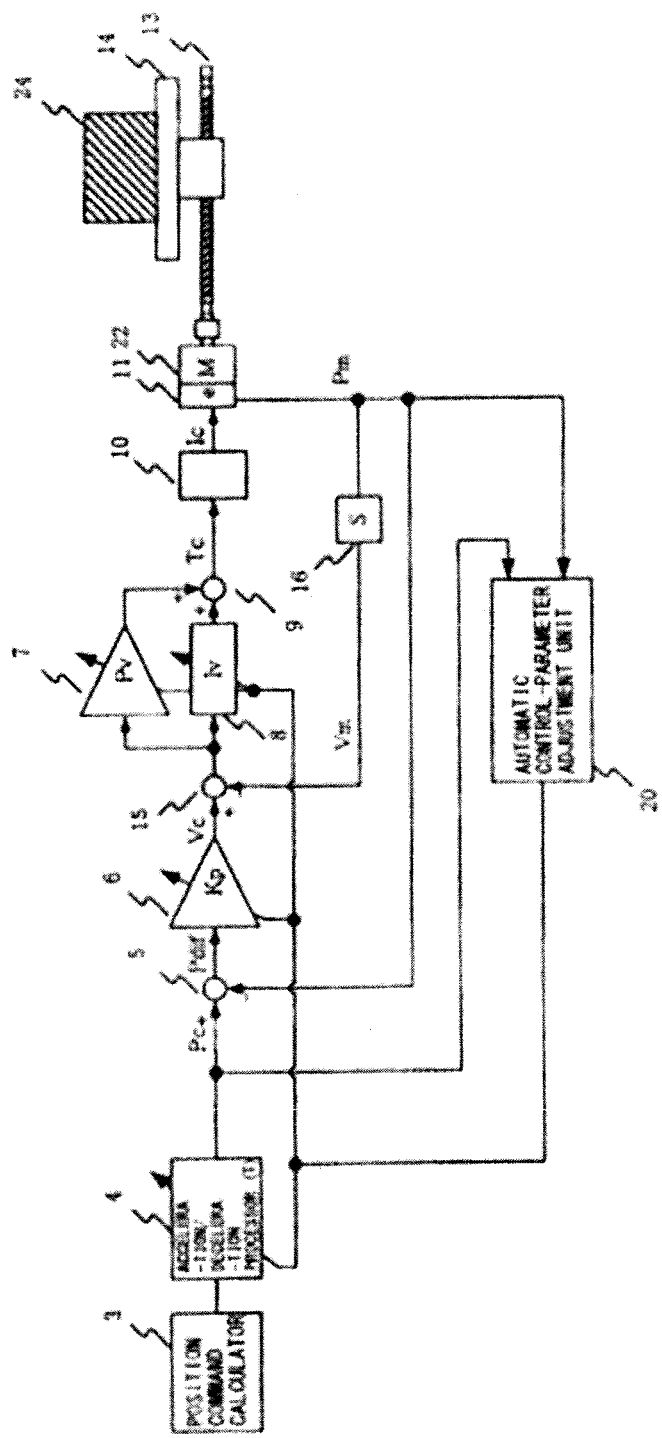
FIG. 18 is a diagram showing a configuration of another conventional motor control device.
Figure 19:
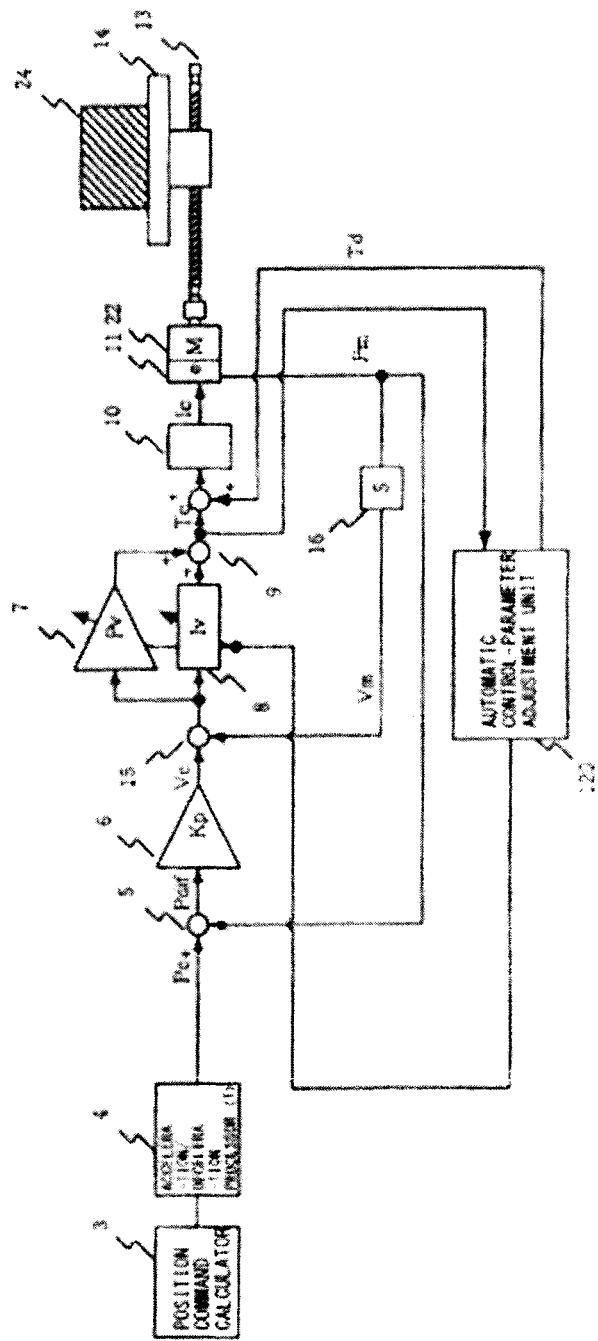
FIG. 19 is a diagram showing a configuration of a further conventional motor control device.

Like the automatic control-parameter adjustment unit 20, 120 in the conventional examples shown in FIGS. 18 and 19, an automatic control-parameter adjustment unit 220 drives a motor while gradually altering a control parameter used for controlling position and velocity of the motor, and, based on a control error obtained at each instance the control parameter is altered, identifies a control parameter value suitable for the current control target as the "adjusted control parameter". More specifically, the automatic control-parameter adjustment unit 220 calculates an adjusted control parameter suitable for the current control target based on information such as a position command value Pc, a detected position value Pm, a torque command value Tc, and a torque disturbance Td, and outputs the calculated result to a control parameter changing unit 1. The adjusted control parameter includes adjusted parameters such as an adjusted acceleration/deceleration time constant Ta, an adjusted position loop gain Kpa, an adjusted velocity loop proportional gain Pva, and an adjusted velocity loop integral gain Iva.

An inertia identifying unit 17 calculates an inertia value $J_x$ of the current control target. Alternatively, the inertia value $J_x$ of the current control target may be input by an operator via a user interface. When changing the standard control parameter values stored in the memory device 2, the control parameter changing unit 1 changes the standard control parameter values stored in the memory device 2 based on the adjusted control parameter that is output from the automatic control-parameter adjustment unit 220 using an adjustment control target (i.e., a control target for adjustment purpose), and also based on the inertia value $J_x$ of the adjustment control target output from the inertia identifying unit 17. The changed control parameter values include parameter values such as values of changed acceleration/deceleration time constant Tb, values of changed position loop gain Kpb, values of changed velocity loop proportional gain Pvb, and values of changed velocity loop integral gain Ivb.

Details of the calculation of the changed control parameter values in the control parameter changing unit 1 will be described below with reference to FIGS. 2 to 7. For example, a case in which the calculation is performed for a control parameter that varies in proportion to magnitude of the inertia of the control target will be described with reference to FIGS. 2 and 3. Here, the calculation of the changed parameter values of the acceleration/deceleration time constant Tf is shown as an example.

Figure 2:
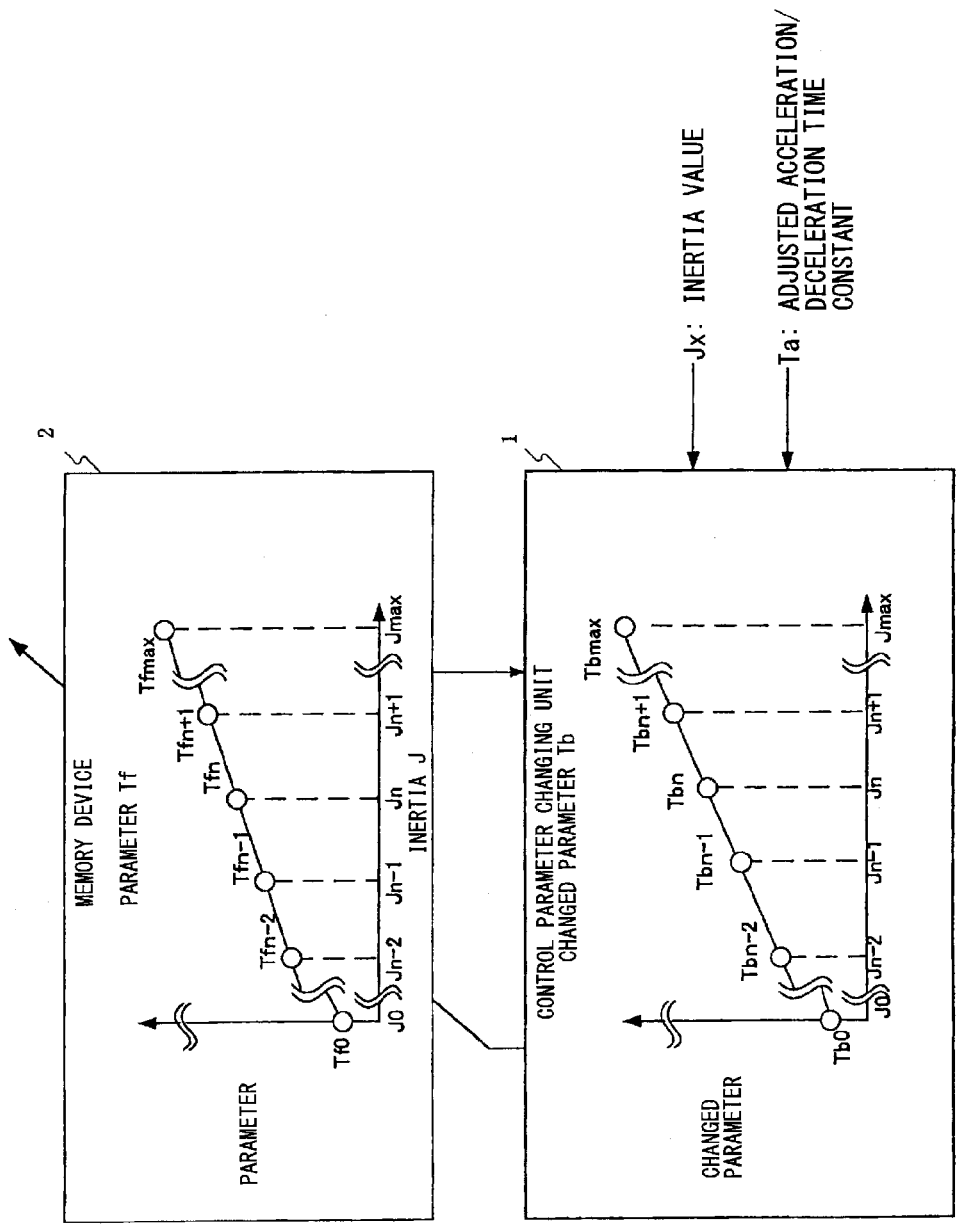
FIG. 2 is a diagram showing a configuration of a memory device and a control parameter changing unit.

FIG. 2 shows the control parameter changing unit 1 and the memory device 2 shown in FIG. 1. The control parameter changing unit 1 receives input of: (i) an adjusted acceleration/deceleration time constant Ta, which is an adjusted control parameter output from the automatic control-parameter adjustment unit 220 shown in FIG. 1; (ii) the inertia value $J_x$ output from the inertia identifying unit 17; (iii) the acceleration/deceleration time constant values $Tf_k$ (where $0 \leq k \leq max$), which are the standard control parameter values stored in the memory device 2; and (iv) the preset plurality of different inertia values $J_0 \sim J_{max}$. Based on the input values, the control parameter changing unit 1 calculates the changed acceleration/deceleration time constant values $Tb_k$, and replaces the acceleration/deceleration time constant values $Tf_k$ stored in the memory device 2 with the changed acceleration/deceleration time constant values $Tb_k$.

Figure 3:
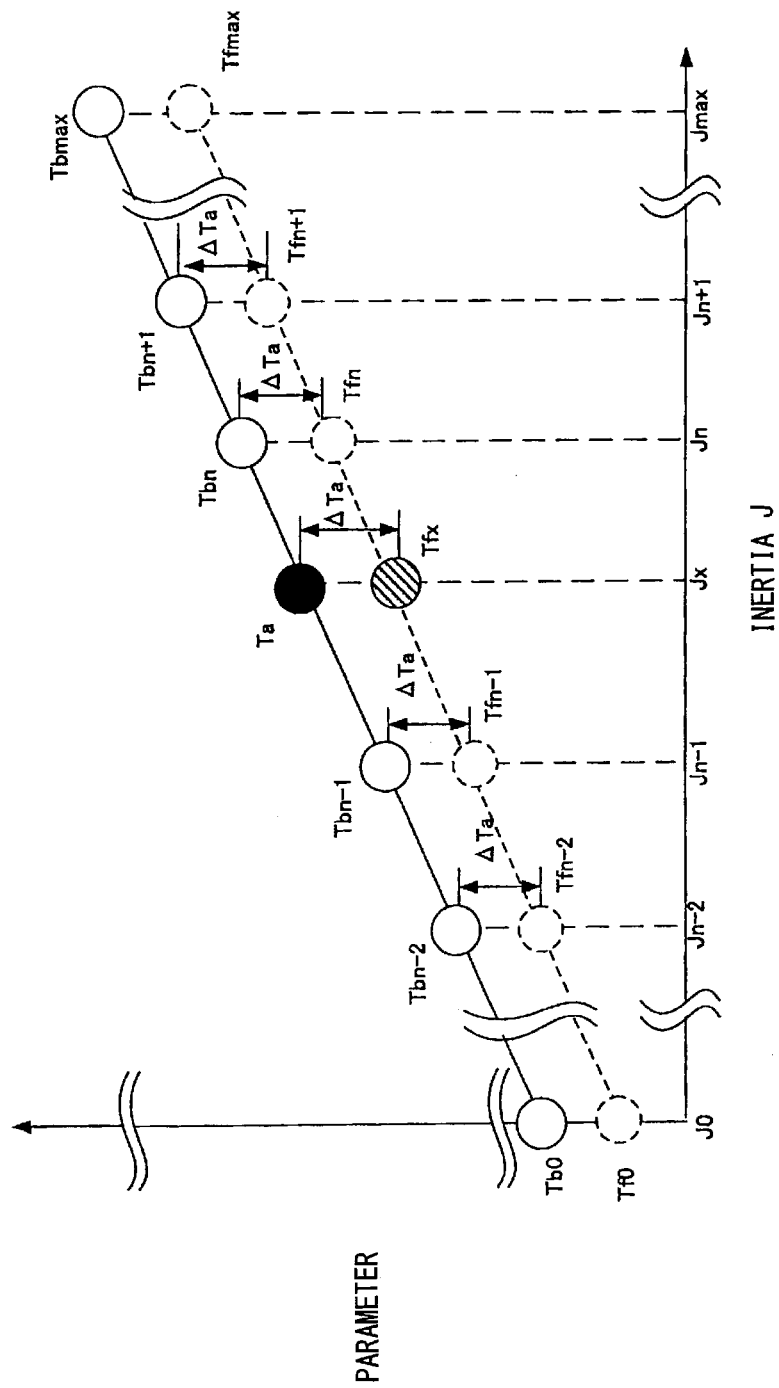
FIG. 3 is a diagram explaining a method of calculating a changed acceleration/deceleration time constant.

The method of calculating the changed acceleration/deceleration time constant values $Tb_k$ will now be described with reference to FIG. 3. As shown in FIG. 3, when the input inertia value $J_x$ (i.e., the inertia value at the time when the adjusted control parameter was calculated in the automatic control-parameter adjustment unit 220) is a value between the inertia values $J_n$ and $J_{n-1}$, the control parameter changing unit 1 uses Formula 2 shown below to interpolate between the acceleration/deceleration time constant values $Tf_n$ and $Tf_{n-1}$ assigned to the inertia values $J_n$ and $J_{n-1}$, to thereby calculate an interpolated acceleration/deceleration time constant $Tf_x$. This interpolated acceleration/deceleration time constant $Tf_x$ is a reference control parameter, which is a control parameter value that, according to the standard control parameter values, corresponds to the inertia value of the adjustment control target.

$$Tf_x=(Tf_n-Tf_{n-1})\div(J_n-J_{n-1})\times(J_x-J_{n-1})+Tf_{n-1} \quad \text{Formula 2}$$

Next, the following Formula 3 is used to calculate a reference difference value $\Delta Ta$, which is a difference between the calculated interpolated acceleration/deceleration time constant $Tf_x$ and the adjusted acceleration/deceleration time constant Ta.

$$\Delta Ta=Tf_x-Ta \quad \text{Formula 3}$$

Next, the changed acceleration/deceleration time constant values $Tb_k$ are calculated for each of the preset plurality of different inertia values $J_0 \sim J_{max}$ stored in the memory device 2. Since the acceleration/deceleration time constant varies in proportion to the inertia of the control target, when the difference between the interpolated acceleration/deceleration time constant $Tf_x$ and the adjusted acceleration/deceleration time constant Ta is equal to $\Delta Ta$ as shown in FIG. 3, the amount of change for each of the acceleration/deceleration time constant values $Tf_0 \sim Tf_{max}$ corresponding to the preset plurality of different inertia values $J_0 \sim J_{max}$ stored in the memory device 2 is also equal to $\Delta Ta$. Accordingly, the changed acceleration/deceleration time constant values $Tb_0 \sim Tb_{max}$ are calculated using Formula 4 shown below. These changed acceleration/deceleration time constant values $Tb_0 \sim Tb_{max}$ serve as the new standard control parameter values $Tf_0 \sim Tf_{max}$.

$$Tb_k=Tf_k-\Delta Ta \text{ (where } 0 \leq k \leq max) \quad \text{Formula 4}$$

As can be understood from the above, according the present example, (i) the reference control parameter ($Tf_x$) corresponding to the inertia value $J_x$ is calculated based on the standard control parameter values (Tf), (ii) the difference between this reference control parameter ($Tf_x$) and the adjusted control parameter (Ta) is calculated to obtain the reference difference value ($\Delta Ta$), and (iii) the values obtained by applying this reference difference value ($\Delta Ta$) to each of the plurality of standard control parameter values (Tf) are used as the new standard control parameter values (Tf).

As another example, a case in which the calculation is performed for a control parameter that varies non-proportionally with respect to magnitude of the inertia of the control target and that, for the maximum and minimum inertia values, does not shift very much from the initial parameter values will be described with reference to FIGS. 4 to 7. Here, calculation of the changed parameter values of the velocity loop proportional gain Pvf is shown as an example.

Figure 4:
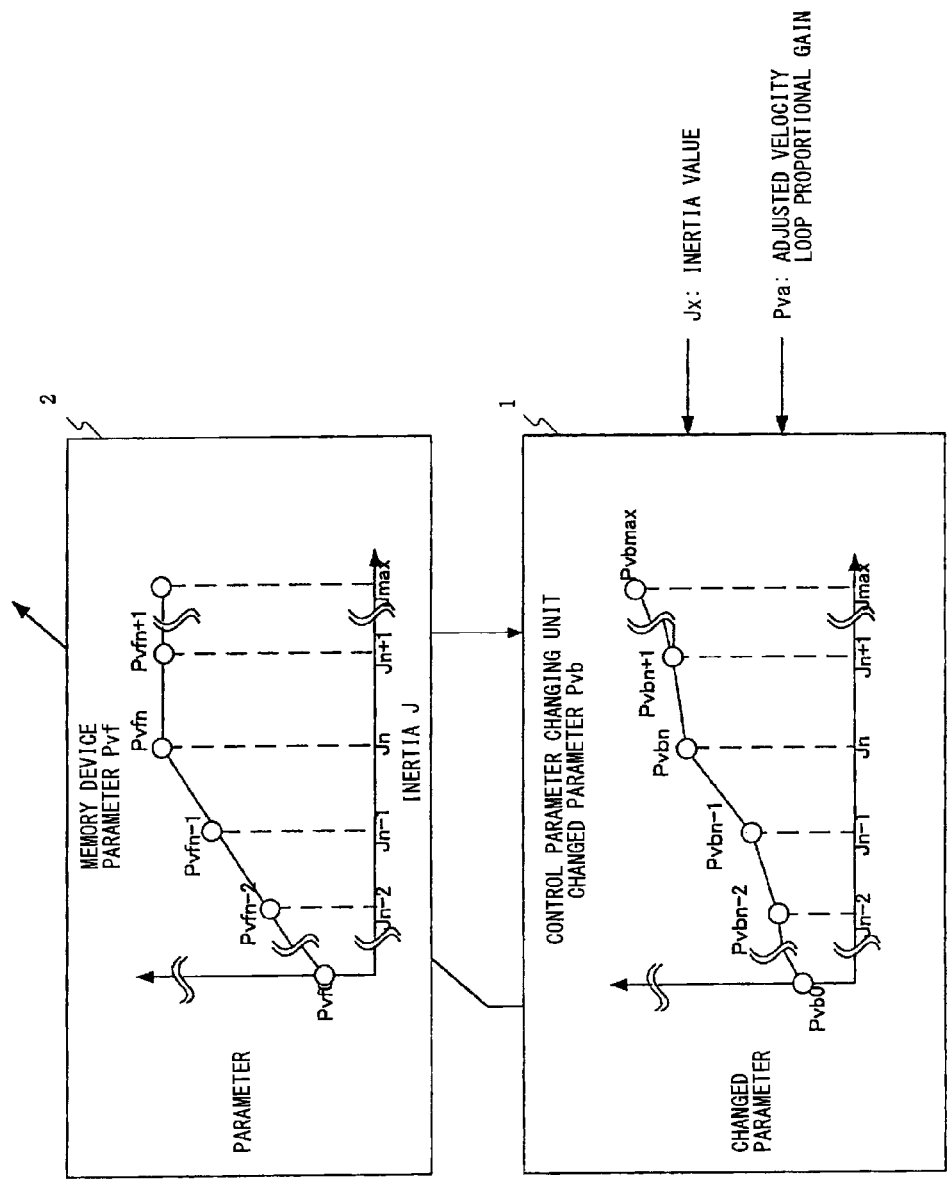
FIG. 4 is a diagram showing a configuration of the memory device and the control parameter changing unit.

FIG. 4 shows the control parameter changing unit 1 and the memory device 2 illustrated in FIG. 1. The control parameter changing unit 1 receives input of: (i) an adjusted velocity loop proportional gain Pva, which is an adjusted control parameter output from the automatic control-parameter adjustment unit 220 shown in FIG. 1; (ii) the inertia value $J_x$ output from the inertia identifying unit 17; (iii) the velocity loop proportional gain values $Pvf_k$ (i.e., the standard control parameter values) stored in the memory device 2; and (iv) the preset plurality of different inertia values $J_0 \sim J_{max}$. Based on the input values, the control parameter changing unit 1 calculates the changed velocity loop proportional gain values $Pvb_k$, and replaces the velocity loop proportional gain values $Pvf_k$ stored in the memory device 2 with the changed velocity loop proportional gain values $Pvb_k$.

Figure 5:
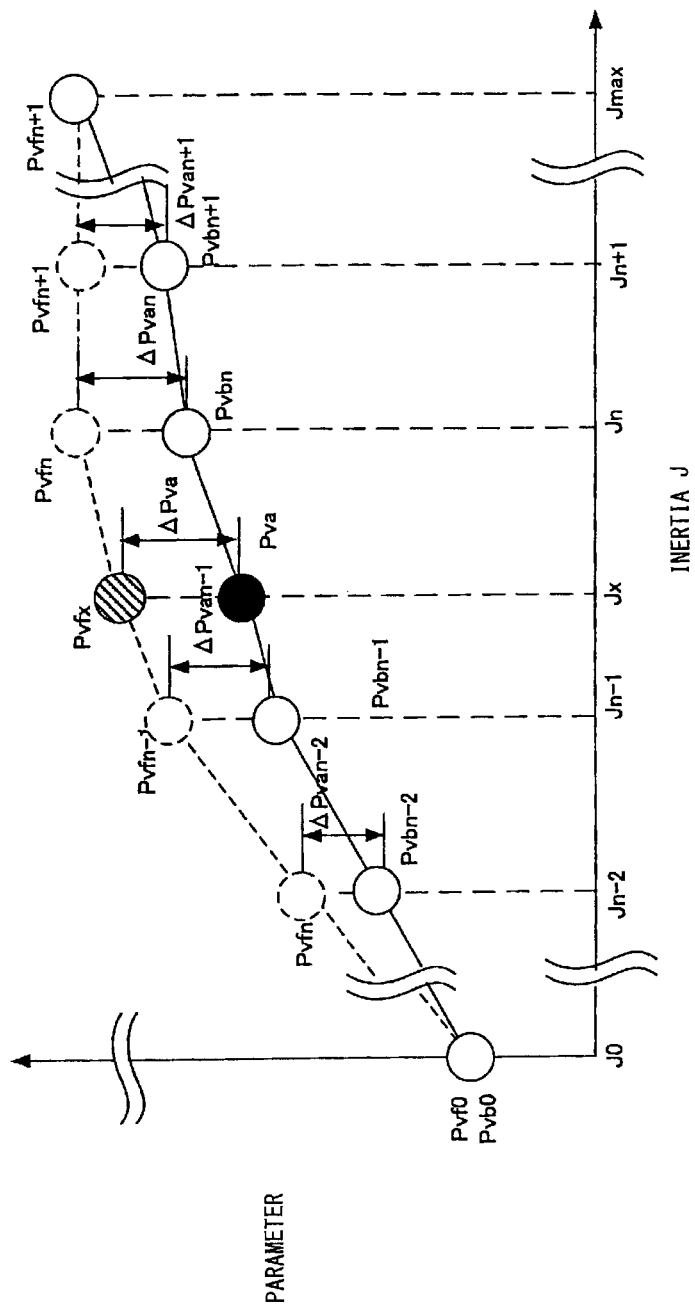
FIG. 5 is a diagram explaining a method of calculating a changed velocity loop proportional gain.

The method of calculating the changed velocity loop proportional gain $Pvb_k$ values will now be described with reference to FIGS. 5 to 7. As shown in FIG. 5, when the input inertia value $J_x$ is a value between the inertia values $J_n$ and $J_{n-1}$, the control parameter changing unit 1 uses Formula 5 shown below to calculate an interpolated velocity loop proportional gain $Pvf_x$ (i.e., the reference control parameter).

$$Pvf_x=(Pvf_n-Pvf_{n-1})\div(J_n-J_{n-1})\times(J_x-J_{n-1})+Pvf_{n-1} \quad \text{Formula 5}$$

Next, a difference $\Delta Pva$ (i.e., the reference difference value) between the calculated interpolated velocity loop proportional gain $Pvf_x$ and the adjusted velocity loop proportional gain Pva is calculated using the following Formula 6.

$$\Delta Pva=Pvf_x-Pva \quad \text{Formula 6}$$

Next, calculation of the changed velocity loop proportional gain values $Pvb_0 \sim Pvb_{n-1}$ for replacing the velocity loop proportional gain values $Pvf_0 \sim Pvf_{n-1}$ assigned to the preset inertia values $J_0 \sim J_{n-1}$ which are smaller than the inertia value $J_x$, as shown in FIG. 5, will be described with reference to FIG. 6.

Figure 6:
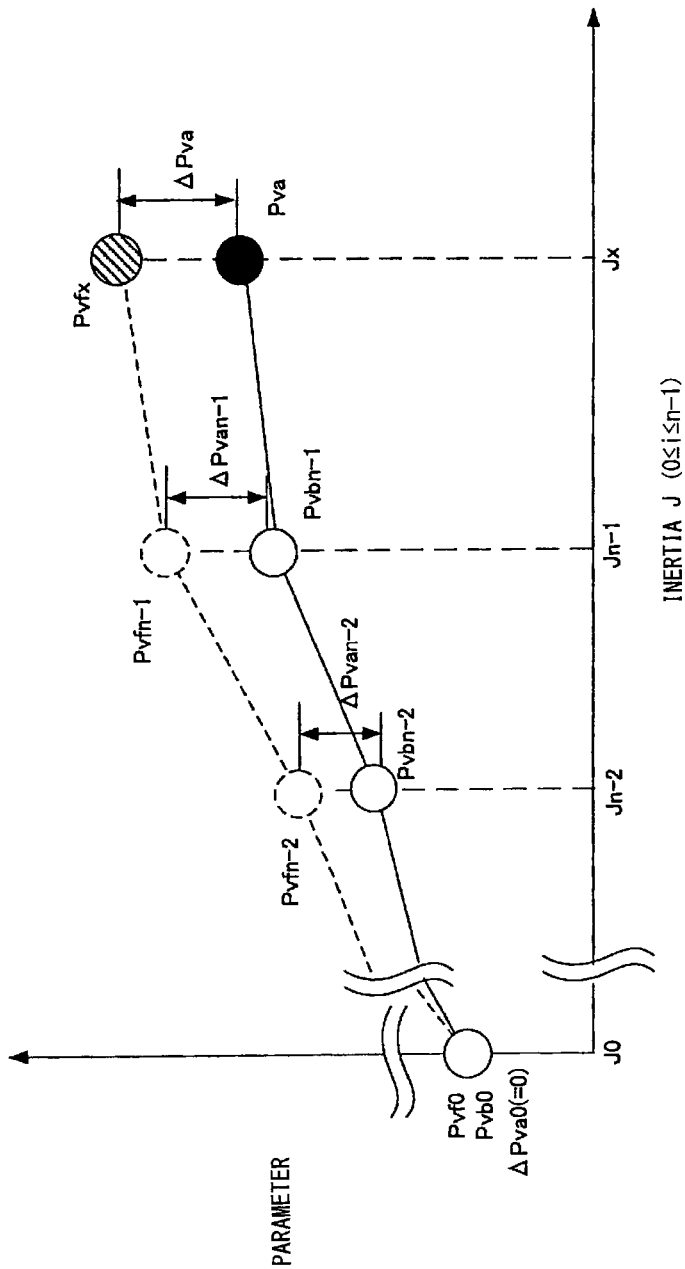
FIG. 6 is a diagram explaining a method of calculating a changed velocity loop proportional gain.
Figure 7:
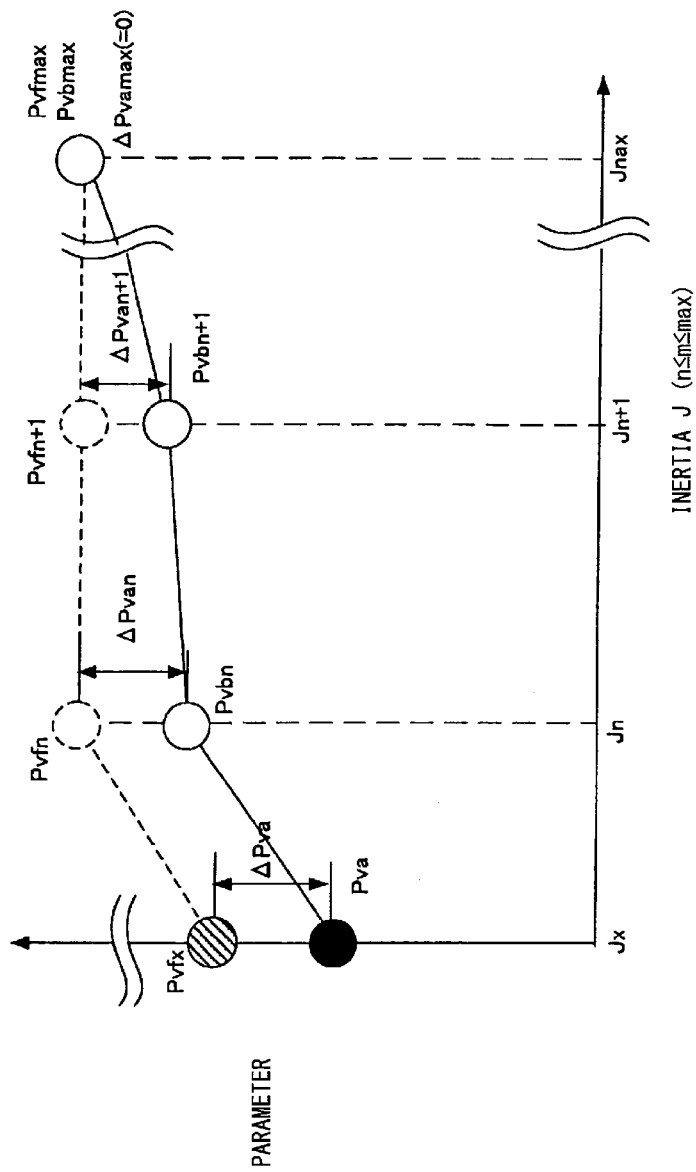
FIG. 7 is a diagram explaining a method of calculating a changed velocity loop proportional gain.

As shown in FIG. 6, an amount of change $\Delta Pva_i$ (i.e., the adjusted difference value) for a velocity loop proportional gain value $Pvf_i$ assigned to a preset inertia value $J_i$ (where $0 \leq i \leq n-1$) that is smaller than the inertia value $J_x$ is calculated, and the calculated amount is subtracted from the velocity loop proportional gain value $Pvf_i$, to thereby obtain the changed velocity loop proportional gain value $Pvb_i$. The amount of change $\Delta Pva_i$ for the velocity loop proportional gain value $Pvf_i$ is calculated using Formula 7 below based on the difference $\Delta Pva$ (shown in FIG. 5) between the interpolated velocity loop proportional gain $Pvf_x$ and the adjusted velocity loop proportional gain Pva.

$$\Delta Pva_i=\Delta Pva \div (J_x-J_0)\times(J_i-J_0) \text{ (where } 0 \leq i \leq n-1) \quad \text{Formula 7}$$

Here, $\Delta Pva_0$ is equal to zero change. The amount of change $\Delta Pva_i$ is subtracted from the velocity loop proportional gain value $Pvf_i$ to obtain the changed velocity loop proportional gain value $Pvb_i$, according to the following Formula 8.

$$Pvb_i = Pvf_i - \Delta Pva_i \text{ (where } 0 \leq i \leq n-1)  \qquad \text{Formula 8}$$

Next, calculation of the changed velocity loop proportional gain values $Pvb_m$ for replacing the velocity loop proportional gain values $Pvf_n$~$Pvf_{max}$ assigned to the preset inertia values $J_n$~$J_{max}$ which are greater than the inertia value $J_x$, as shown in FIG. 5, is described with reference to FIG. 7. As shown in FIG. 7, an amount of change $\Delta Pva_m$ for a velocity loop proportional gain value $Pvf_m$ assigned to a preset inertia value $J_m$ (where $n \leq m \leq$ max) that is greater than the inertia value $J_x$ is calculated, and the calculated amount is subtracted from the velocity loop proportional gain value $Pvf_m$, to thereby obtain the changed velocity loop proportional gain value $Pvb_m$. The amount of change $\Delta Pva_m$ (i.e., the adjusted difference value) for the velocity loop proportional gain value $Pvf_m$ is calculated using Formula 9 below based on the difference $\Delta Pva$ (shown in FIG. 5) between the velocity loop proportional gain $Pvf_x$ and the adjusted velocity loop proportional gain $Pva$.

$$\Delta Pva_m = \Delta Pva - \Delta Pva \div (J_{max} - J_x) \times (J_m - J_x) \text{ (where } n \leq m \leq \text{max)} \qquad \text{Formula 9}$$

Here, $\Delta Pva_{max}$ is equal to zero change. The calculated amount of change $\Delta Pva_m$ is subtracted from the velocity loop proportional gain value $Pvf_m$ to obtain the changed velocity loop proportional gain value $Pvb_m$, according to the following Formula 10.

$$Pvb_m = Pvf_m - \Delta Pva_m \text{ (where } n \leq m \leq \text{max)} \qquad \text{Formula 10}$$

In the above-described manner, the control parameter changing unit 1 shown in FIG. 4 calculates the changed velocity loop proportional gain values $Pvb_0$~$Pvb_{max}$ for the respective preset plurality of different workpiece inertia values, and uses the changed velocity loop proportional gain values $Pvb_0$~$Pvb_{max}$ as the new standard velocity loop proportional gain values $Pvf_0$~$Pvf_{max}$.

As can be understood from the above, according to the present example also, similarly to the first example, (i) the reference control parameter ($Pvf_x$) corresponding to the inertia value $J_x$ is calculated based on the standard control parameter values ($Pvf$), (ii) this reference control parameter ($Pvf_x$) and the adjusted control parameter ($Pva$) are used to calculate values of difference ($\Delta Pva_i$, $\Delta Pva_m$) between the standard control parameter values before change and the standard control parameter values after change, and (iii) these difference values are applied to the standard control parameter values before change, so as to calculate the standard control parameter values after change. In the present example, the difference values applied to the standard control parameter values are values that vary depending on the inertia value.

Figure 8:
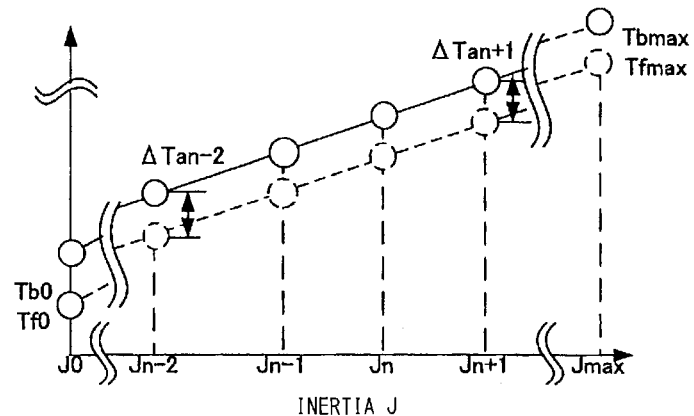
FIG. 8 is a diagram showing a relationship between values of acceleration/deceleration time constant before change and after change.

While the above explanations relate to calculations of the changed acceleration/deceleration time constant Tb and the changed velocity loop proportional gain Pvb, calculations of the changed position loop gain Kpb, the changed velocity loop integral gain Ivb, and the like are also performed in a similar manner. Details of the data of the changed parameters are shown in FIGS. 8 to 11. FIG. 8 shows the changed acceleration/deceleration time constant Tb. From the acceleration/deceleration time constant values $Tf_0$~$Tf_{max}$, the amounts of change $\Delta Ta_0$~$\Delta Ta_{max}$, such as $\Delta Ta_{n-2}$ and $\Delta Ta_{n+1}$, are subtracted, respectively, to thereby calculate the changed acceleration/deceleration time constant values $Tb_0$~$Tb_{max}$.

Figure 9:
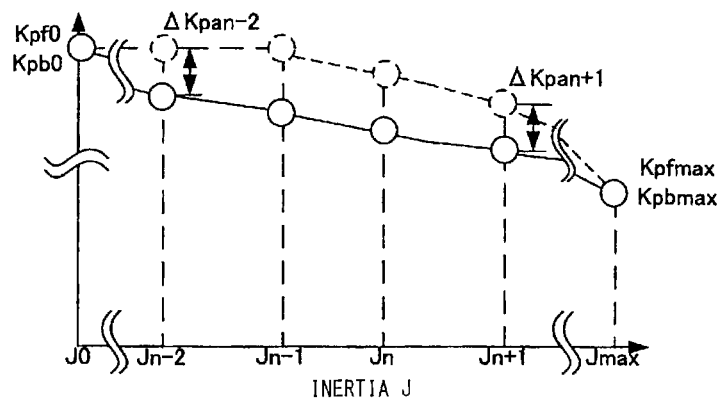
FIG. 9 is a diagram showing a relationship between values of velocity loop proportional gain before change and after change.
Figure 10:
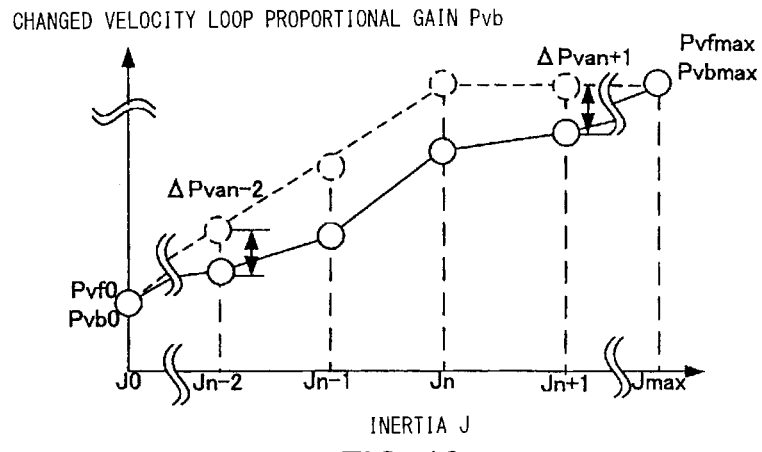
FIG. 10 is a diagram showing a relationship between values of position loop gain before change and after change.
Figure 11:
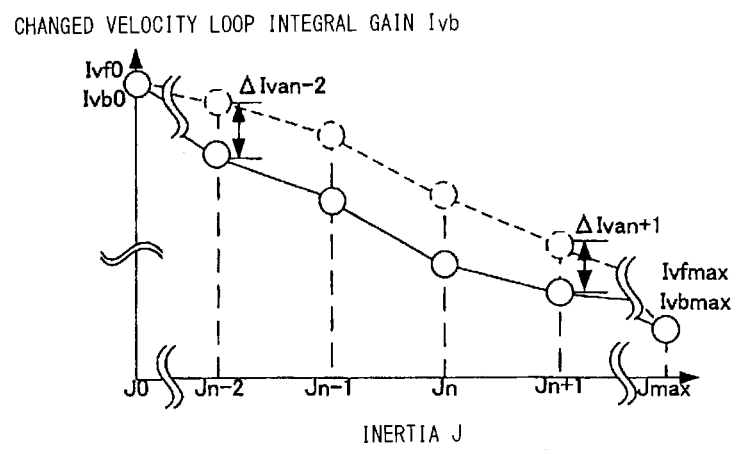
FIG. 11 is a diagram showing a relationship between values of velocity loop integral gain before change and after change.
Figure 12:
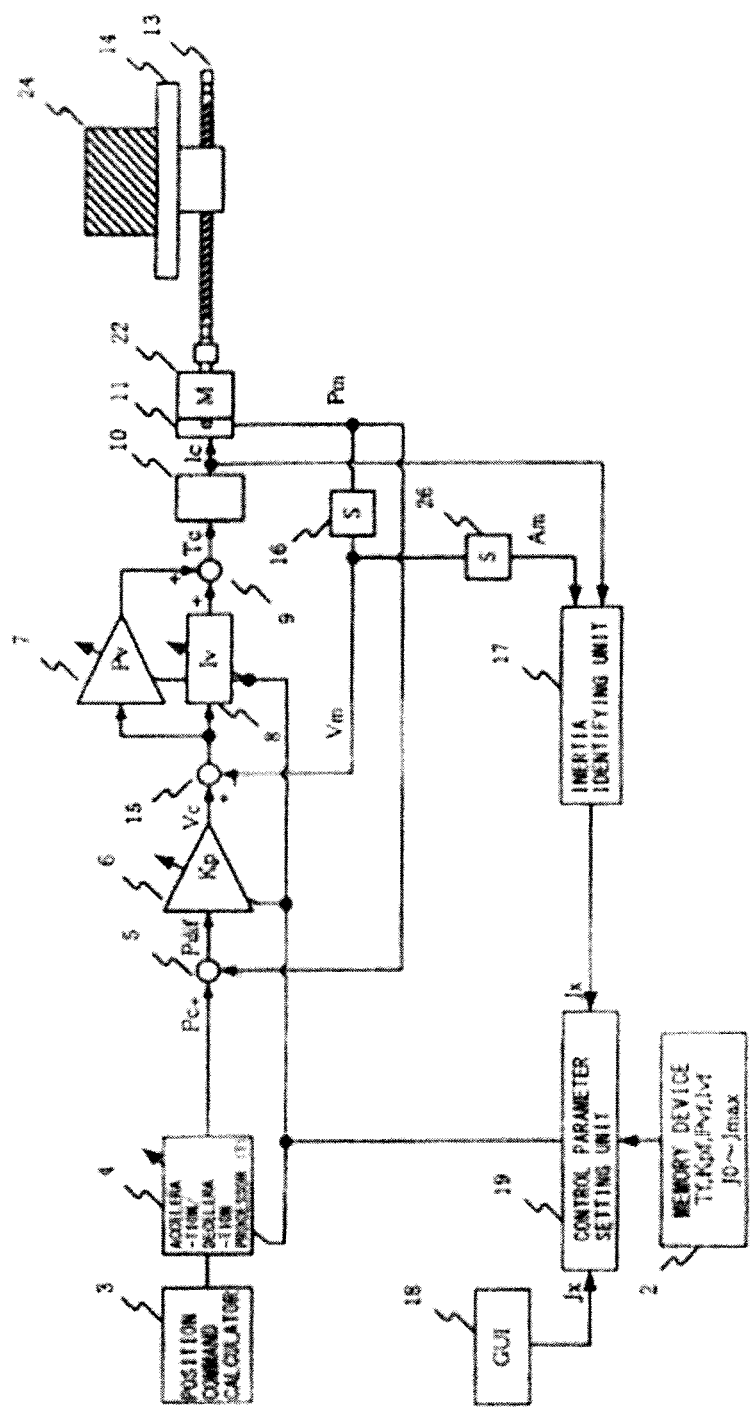
FIG. 12 is a diagram showing a configuration of a conventional motor control device.
Figure 13:
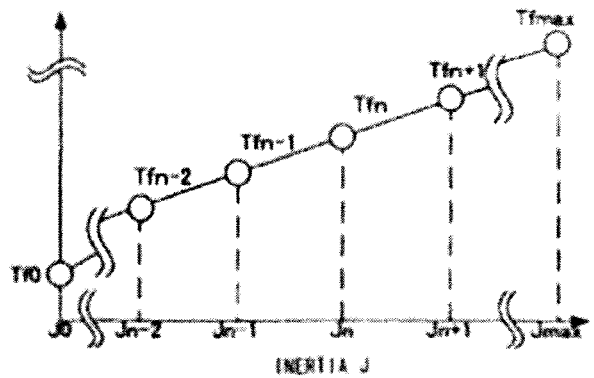
FIG. 13 is a diagram showing an acceleration/deceleration time constant used in a conventional device.
Figure 14:
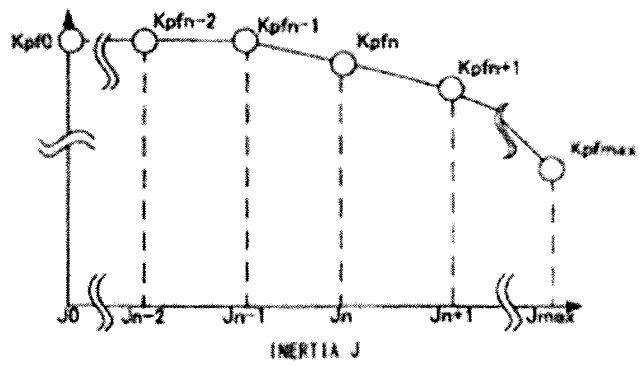
FIG. 14 is a diagram showing a velocity loop proportional gain used in a conventional device.
Figure 15:
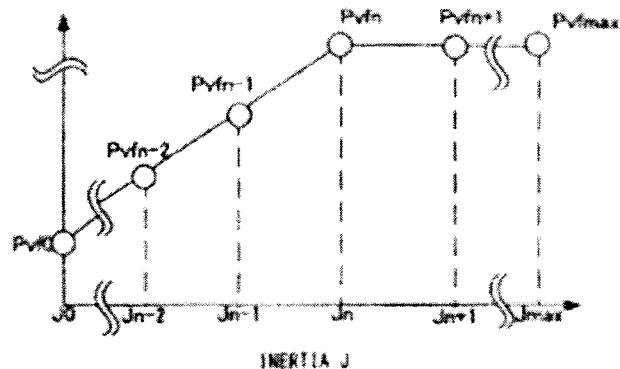
FIG. 15 is a diagram showing a position loop gain used in a conventional device.
Figure 16:
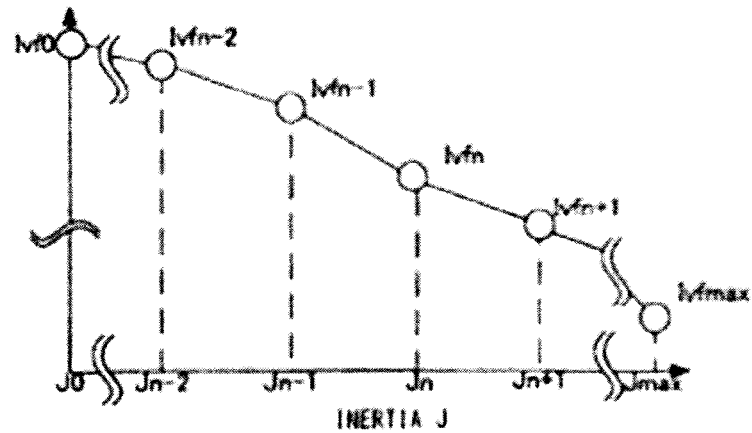
FIG. 16 is a diagram showing a velocity loop integral gain used in a conventional device.
Figure 17:
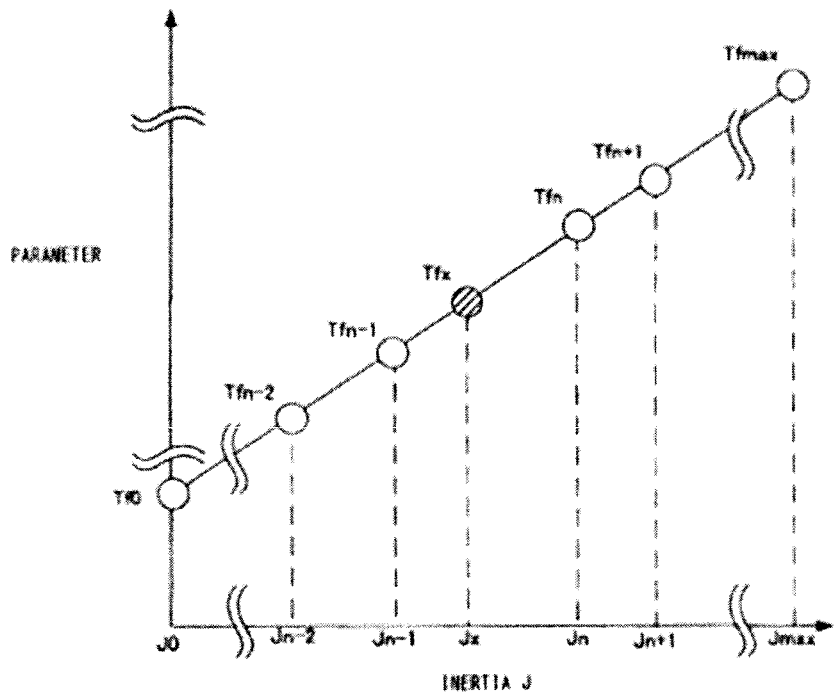
FIG. 17 is a diagram explaining a method of calculating an acceleration/deceleration time constant in a conventional device.

FIG. 9 shows the changed position loop gain Kpb. From the position loop gain values $Kpf_0$~$Kpf_{max}$, the amounts of change $\Delta Kpa_0$~$\Delta Kpa_{max}$, such as ~$Kpa_{n-2}$ and $\Delta Kpa_{n+1}$, are subtracted, respectively, to thereby calculate the changed position loop gain values $Kpb_0$~$Kpb_{max}$. FIG. 10 shows the changed velocity loop proportional gain Pvb. From the velocity loop proportional gain values $Pvf_0$~$Pvf_{max}$, the amounts of change $\Delta Pva_0$~$\Delta Pva_{max}$, such as $\Delta Pva_{n-2}$ and $\Delta Pva_{n+1}$, are subtracted, respectively, to thereby calculate the changed velocity loop proportional gain values $Pvb_0$~$Pvb_{max}$. FIG. 11 shows the changed velocity loop integral gain Ivb. From the velocity loop integral gain values $Ivf_0$~$Ivf_{max}$, the amounts of change $\Delta Iva_0$~$\Delta Iva_{max}$, such as $\Delta Iva_{n-2}$ and $\Delta Iva_{n+1}$, are subtracted, respectively, to thereby calculate the changed velocity loop integral gain values $Ivb_0$~$Ivb_{max}$. As the position loop gain and the velocity loop integral gain are not in proportion to inertia, Formulas 5 to 10 are used when changing the standard control parameter values for these parameters, similarly to the velocity loop proportional gain.

While the above description refers to an example in which the parameter changing unit 1 has the functions of both of Formulas 2 to 4 and Formulas 5 to 10 and uses the two groups of formulas separately depending on the parameters, the parameter changing unit 1 may alternatively have the function of Formulas 2 to 4 only, or the function of Formulas 5 to 10 only.

REFERENCE SYMBOLS

1 control parameter changing unit
2 memory device
3 position command calculator
4 acceleration/deceleration processor
5, 15 subtractor
6 position loop gain
7 velocity loop proportional gain
8 velocity loop integral gain
9 adder
10 various filter units, current control unit
11 motor position detector
13 ball screw
14 table
16, 26 differentiator
17 inertia identifying unit
18 GUI
19 control parameter setting unit
20, 120, 220 automatic control-parameter adjustment unit
22 motor
24 workpiece

The invention claimed is:
1. A control device, comprising:
   a memory device having stored therein respective values of a control parameter for each of a plurality of different inertia values, as standard control parameter values; and
   a control parameter setting unit configured to calculate, based on the standard control parameter values, a control parameter value corresponding to an inertia value of a control target, and configured to set the control parameter value;
   wherein the control device is a device that is configured to control position and velocity of a motor in accordance with the control parameter value set by the control parameter setting unit, wherein the control device further comprises:
an automatic control-parameter adjustment unit configured to drive the motor while using an adjustment control target, and configured to gradually alter a control parameter used for controlling position and velocity of the motor, and, based on a control error obtained at each instance the control parameter is altered, configured to identify a control parameter value suitable for the adjustment control target as an adjusted control parameter; and
a control parameter changing unit configured to change the standard control parameter values based on the adjusted control parameter and an inertia value of the adjustment control target.

2. The control device according to claim 1, wherein the control parameter changing unit is configured to
(i) calculate, based on the standard control parameter values, a control parameter value corresponding to the inertia value of the adjustment control target, as a reference control parameter,
(ii) calculate a reference difference value between the adjusted control parameter and the reference control parameter corresponding to the inertia value of the adjustment control target,
(iii) calculate, based on the reference difference value, adjusted difference values corresponding to the plurality of different inertia values, and
(iv) calculate, as new standard control parameter values, values corresponding to the standard control parameter values by applying the adjusted difference values.

3. The control device according to claim 2, wherein the control parameter changing unit is configured to:
if the standard control parameter values to be changed are values of a control parameter that varies in proportion to inertia values, calculate the adjusted difference values to be a constant value, and
if the standard control parameter values to be changed are values of a control parameter that does not vary in proportion to inertia values, calculate the adjusted difference values to be variable values that differ depending on the inertia values.

4. The control device according to claim 2, wherein
if the standard control parameter values to be changed are values of a control parameter that varies in proportion to inertia values, the reference difference value is the adjusted difference values.

5. The control device according to claim 2, wherein, if the standard control parameter values to be changed are values of a control parameter that does not vary in proportion to inertia values,
(i) the adjusted difference values corresponding to a maximum inertia value and a minimum inertia value among the plurality of different inertia values are zero,
(ii) absolute values of the adjusted difference values corresponding to inertia values between the inertia value of the adjustment control target and the maximum inertia value are values reduced from the reference difference value in proportion to the inertia values, and
(iii) absolute values of the adjusted difference values corresponding to inertia values between the inertia value of the adjustment control target and the minimum inertia value are values reduced from the reference difference value in proportion to the inertia values.

* * * * *